(12) United States Patent
Bertin (10) Patent No.: US 10,637,927 B2
(45) Date of Patent: Apr. 28, 2020

(54) LOW POWER SENSOR COMMUNICATION USING TWO OR FEWER WIRES

(71) Applicant: SEMICONDUCTOR COMPONENTS INDUSTRIES, LLC, Phoenix, AZ (US)

(72) Inventor: Jacques Jean Bertin, Pocatello, ID (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/205,417

(22) Filed: Nov. 30, 2018

(65) Prior Publication Data

US 2019/0109905 A1 Apr. 11, 2019

Related U.S. Application Data

(63) Continuation of application No. 15/271,637, filed on Sep. 21, 2016, now Pat. No. 10,178,178.

(51) Int. Cl.
*H04L 29/08* (2006.01)
*B60C 23/04* (2006.01)
(Continued)

(52) U.S. Cl.
CPC .......... *H04L 67/12* (2013.01); *B60C 23/0447* (2013.01); *B60C 23/0474* (2013.01);
(Continued)

(58) Field of Classification Search
CPC ...... H04W 76/10; H04W 48/16; H04L 67/12; H04Q 9/00; B60C 23/0474; B60C 23/0447; G08C 19/02; G08C 19/16
See application file for complete search history.

(56) References Cited

U.S. PATENT DOCUMENTS

| 8,270,209 B2 | 9/2012 | Herr et al. |
| 2008/0196945 A1* | 8/2008 | Konstas .............. G06F 3/03547 178/18.03 |

(Continued)

OTHER PUBLICATIONS

Peripheral Service Interface 5, "Peripheral Sensor Interface for Automotive Applications," Technical Specification, PSI5 Peripheral Sensor Interface, V2.1, Aug. 10, 2012, 62 p.

*Primary Examiner* — Brian D Nguyen
(74) *Attorney, Agent, or Firm* — Wash Park IP Ltd.; John T. Kennedy (57) ABSTRACT

A device includes a first control element which transitions a sensor module between an active and an inactive mode. A second control element is configured to adjust currents drawn by the sensor module during the inactive mode—such currents corresponding to sensor readings. A processor is coupled by a power signal to a sensor module, which operates over an active sensor, a transition, and a data transfer state. Currents drawn during the active sensor state are substantially constant. During transition, currents decrease from the substantially constant current to a minimum current. During data transfer, currents vary between the substantially constant current and the minimum current. A logical element is configured to monitor the current drawn by the sensor module and, based on variations therein, determine the operating state of the sensor module. A method for using the processor is also disclosed.

20 Claims, 2 Drawing Sheets

(51) Int. Cl.
*G08C 19/02* (2006.01)
*G08C 19/16* (2006.01)
*H04Q 9/00* (2006.01)
*H04W 48/16* (2009.01)
*H04W 76/10* (2018.01)

(52) U.S. Cl.
CPC ............ *G08C 19/02* (2013.01); *G08C 19/16* (2013.01); *H04Q 9/00* (2013.01); *H04W 48/16* (2013.01); *H04W 76/10* (2018.02)

(56) References Cited

U.S. PATENT DOCUMENTS

| | | | |
|---|---|---|---|
| 2009/0086831 A1 | 4/2009 | Punyko et al. | |
| 2012/0033337 A1 | 2/2012 | Gruber | |
| 2014/0062582 A1 | 3/2014 | Hammerschmidt | |
| 2016/0357265 A1* | 12/2016 | Maani | G06F 3/014 |
| 2016/0370777 A1* | 12/2016 | Tan | G05B 19/0426 |
| 2017/0088072 A1* | 3/2017 | Curtis | G08B 21/182 |
| 2017/0138986 A1* | 5/2017 | Kern | G01D 3/022 |
| 2018/0216389 A1* | 8/2018 | Tsui | E05F 15/40 |
| 2018/0299369 A1* | 10/2018 | Marta | G01N 21/3504 |

\* cited by examiner

LOW POWER SENSOR COMMUNICATION USING TWO OR FEWER WIRES

CROSS REFERENCE TO RELATED APPLICATIONS

The present application claims priority to U.S. Utility application Ser. No. 15/271,637, entitled "Low Power Sensor Communication Using Two or Fewer Wires", which was filed by the present Applicant on Sep. 21, 2016, in the name of inventor Jacques Jean Bertin et al., and which issued as U.S. Pat. No. 10,178,178 on 8 Jan. 2019, the entire contents of which are incorporated herein by reference.

BACKGROUND

Sensors that communicate with a processor may be located remotely with respect to the processor. In some circumstances, these remote locations may have limited access to power and may involve high cost for providing electrical connectivity between the sensor and the processor. Thus, for some sensors, it may be advantageous to reduce a number of electrical wires providing connectivity between the sensor and the processor. For some sensors it may also be advantageous to minimize an amount of power consumed by the sensor. Such reduced connections with minimized power consumption, however, may be difficult to implement

SUMMARY

At least some of the embodiments disclosed herein are directed to a sensor module, comprising: a sensor configured to capture data; a sensor interface coupled to the sensor and configured to process the data captured by the sensor to form processed data; a current consumption configuration component and a transistor coupled to the current consumption configuration component and configured to control the current consumption configuration component to output the processed data. Such embodiments may be supplemented in a variety of ways, including by adding any of the following concepts in any sequence and in any combination: wherein the sensor module is configured to couple to a processor, and wherein the transistor is configured to control the current consumption configuration component to output the processed data to the processor; wherein the sensor module is further configured to draw a first current magnitude from the processor when the sensor captures data and the sensor interface processes the data captured by the sensor; wherein the sensor module is further configured to couple directly to the processor via only one electrical wire, the electrical wire configured to provide power from the processor to the sensor module and communicate the processed data from the sensor module to the processor; wherein the transistor is configured to control the current consumption configuration component to alternate a current draw of the sensor module between the first current magnitude and a second current magnitude less than the first current magnitude to communicate the processed data to the processor; wherein the first current magnitude represents a binary one, and wherein the second current magnitude represents a binary zero; wherein the sensor is an automotive pressure sensor.

At least some of the embodiments disclosed herein are directed to a method for capturing data and communicating the data from a sensor module to a processor, comprising: activating a sensor of the sensor module to capture the data; activating a current source to maintain an approximately constant current draw of a first current magnitude by the sensor module via a first electrical wire when the sensor is activated, the first electrical wire configured to couple the sensor module to the processor to provide power to the sensor module; storing the data; deactivating the sensor after the data is captured and stored; and selectively deactivating and reactivating the current source based on a content of the stored data to communicate the stored data from the sensor module to the processor via the first electrical wire. Such embodiments may be supplemented in a variety of ways, including by adding any of the following concepts in any sequence and in any combination: wherein selectively deactivating and reactivating the current source based on the content of the stored data comprises deactivating the current source to communicate a first value of the stored data and reactivating the current source to represent a second value of the stored data; wherein to communicate the stored data from the sensor module to the processor, the method further comprises drawing a second current magnitude less than the first current magnitude to represent the first value and drawing the first current magnitude to represent the second value; wherein the second current magnitude is an approximately minimum current draw of the sensor module; wherein selectively deactivating and reactivating the current source comprises controlling a transistor to deactivate and reactivate the current source; further comprising activating the sensor to capture second data after communicating the stored data from the sensor module to the processor via the electrical wire; and wherein the first current magnitude is approximately 3 milliamps (mA) and the second current magnitude is approximately 1 mA.

At least some of the embodiments disclosed herein are directed to a system, comprising: a processor; and a sensor module coupled to the processor and configured to draw a first magnitude of current from the processor to capture data, the sensor module comprising: a current source; a sensor configured to capture the data; and a transistor configured to control the current source to communicate the data from the sensor module to the processor, wherein the transistor alternates a current draw of the sensor module between the first magnitude of current and a second magnitude of current. Such embodiments may be supplemented in a variety of ways, including by adding any of the following concepts in any sequence and in any combination: wherein the second magnitude of current is less than the first magnitude of current, and wherein, to communicate data to the processor, the sensor module draws the first magnitude of current to represent a first data value and draws the second magnitude of current to represent a second data value; wherein the first data value is a logical high value and the second data value is a logical low value; wherein to control the current source, the transistor selectively activates and deactivates the current source; wherein the sensor is an automobile pressure sensor; and wherein the sensor module is configured to couple to the processor via two or fewer electrical wires, and wherein the two or fewer electrical wires are selected from the group consisting of: a power supply electrical wire and a ground electrical wire.

BRIEF DESCRIPTION OF THE DRAWINGS

There are disclosed in the drawings and in the following description, various embodiments for communication of data from a sensor to a processor when the sensor is coupled to the processor using two or fewer electrical wires. In the drawings.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Sensors may be used to provide useful data to a processor from locations remote to the processor. For example, a temperature or precipitation sensor may be located in an environmentally exposed location and may be coupled to a processor that is enclosed within a housing to provide data to the processor. As another example, a pressure sensor in an automobile may be located proximate to a wheel or tire of the automobile and may be coupled to a processor located elsewhere in the automobile to provide data to the processor. As used herein, a sensor is any electrical and/or mechanical component or combination of components that is suitable for capturing data and communicating that data to a processor. Also as used herein, a processor is any form of a processing element such as a processor, microprocessor, central processing unit (CPU), an embedded processor, a digital signal processor, digital logic, or any other electrical structure suitable for receiving and/or performing operations with data, such as that communicated by a sensor. A sensor may be coupled to a processor via one or more communication lines (e.g., electrical wires). As such, use of a sensor may in some embodiments involve a plurality of costs (e.g., a material cost per unit distance of communication line that couples the sensor to the processor and a power cost for the amount of available power in a system that is consumed by the sensor to capture and/or communicate data). In some systems (e.g., systems in which power is limited or is considered to have a high cost) it may be desirable to minimize an amount of current consumed by a sensor when capturing data and/or communicating data to a processor. It may also be desirable to minimize an amount of material cost associated with use of a sensor by minimizing a quantity of communications lines that couple the sensor to the processor.

Disclosed herein are embodiments for communicating data from a sensor to a processor. More precisely, at least some embodiments are directed to communicating data from a sensor to a processor at low power when the sensor is coupled to the processor via two or fewer couplings. At least some of the disclosed embodiments may provide for a sensor communicating data to a processor while consuming a current magnitude approximately equal to or less than a current magnitude utilized by the sensor to capture data. For example, in some embodiments the sensor may capture data and communicate that data to the processor within a 3 mA current limit. At least some of the disclosed embodiments may also provide for a sensor communicating data to a processor when the sensor is coupled to the processor by two or fewer communication lines. For example, in some embodiments the sensor may communicate data to the processor on a power line when the sensor is coupled to the processor via two communication lines (e.g., a power or source line used by the sensor to draw a magnitude of current from the processor for operation of the sensor and a ground line). As another example, in some embodiments the sensor may communicate data to the processor on a power line when the sensor is coupled to the processor via one communication line (e.g., a power or source line) and coupled to a common ground plane to which the processor is also coupled (e.g., a metal surface of an automobile that is coupled to a ground supply when the sensor and the processor are utilized in an automobile). The sensor may, in some embodiments, communicate the data to the processor on the power line by varying a current magnitude drawn by the sensor from the processor (e.g., varying the current magnitude drawn by the sensor based on a plurality of values or levels corresponding to digital logic levels or other predefined values).

Figure 1:
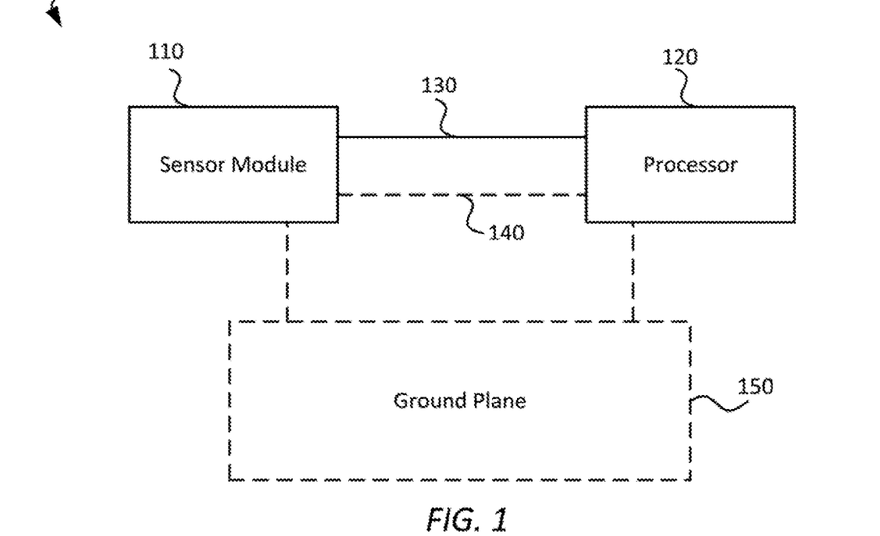
FIG. 1 is a conceptual block diagram of an electrical circuit including a control circuit used for synchronization of a plurality of switching events.

FIG. 1 is a block diagram of a system 100 including a sensor module 110 and a processor 120 in accordance with various embodiments. The sensor module 110 may be coupled to the processor 120 via a power communication line 130. The sensor module 110 may optionally also be coupled to the processor 120 via a ground communication line 140 such that the sensor module 110 is directly coupled to the processor 120 via two couplings. Alternatively, the sensor module 110 may optionally be coupled to a common ground plane 150 to which the processor 120 is also optionally coupled such that the sensor module 110 is directly coupled to the processor 120 via only one coupling. As used herein, a direct coupling between generic representative components A and B may indicate a coupling exclusively between component A and component B with no other intervening components. For example, a direct coupling, in some embodiments, may be characterized by an electrical wire coupling at a first end to component A and at a second end to component B. Conversely, an indirect coupling between components A and B may indicate that components A and B are coupled through an intermediary component to which both component A and component B are individually, directly or indirectly, coupled. For example, an indirect coupling, in some embodiments, may be characterized by component A and component B, each coupling individually, directly or indirectly, to a common ground plane.

The processor 120 may provide power (e.g., a voltage magnitude and a current magnitude) to the sensor module 110 via the power communication line 130. The voltage magnitude and/or current magnitude may be determined with respect to the ground communication line 140, or the common ground plane 150, depending on which source of a ground reference is utilized in the system 100. The current magnitude provided by the processor 120 to the sensor module 110 may be determined, in some embodiments, by a current magnitude drawn by the sensor module 110 and consumed during operation of the sensor module 110. The sensor module 110 may be configured to draw an approximately constant current magnitude from the processor 110 during data capture operations of the sensor module 110. The sensor may be further configured to communicate data to the processor 120 by manipulating the current magnitude drawn by the sensor module 110 during data communication operations of the sensor module 110. For example, the sensor may be configured to consume an approximately constant X mA during data capture operations. When communicating data, the sensor module 110 consuming approximately X mA may be interpreted by the processor 120 as a logic-level high value (e.g., a digital "1") and the sensor module 110 consuming approximately X-Y mA may be interpreted by the processor 120 as a logic-level low value (e.g., a digital "0"), where is a predefined gap between the logic-level high value and the logic-level low value. For example, the sensor 120 consuming approximately 3 mA when communicating data may be interpreted as a logic-level high and the sensor 120 consuming, approximately 1 mA when communicating data may be interpreted as a logic-level low. In this way, the sensor module 110 may communicate data to the processor 120 by manipulating the current magnitude consumed by the sensor module 110.

The values X and Y may be any suitable current magnitudes that result in a desired operation of the sensor module 110. In addition, while the sensor module 110 is discussed above as indicating two separate values (e.g., a logic-level high value and a logic-level low value), the sensor module 110 may be configured to indicate any number of levels by manipulating the current magnitude drawn by the sensor module 110 during data communication operations of the sensor module 110. For example, the sensor module 110 may be configured to indicate three values, four values, five values, and so forth by manipulating the current magnitude drawn by the sensor module 110 during data communication operations of the sensor module 110 according to predetermined or predefined levels known to the processor 120.

Additionally, by communicating with the processor 120 via the power communication line 130, the sensor module 110 may, in some embodiments, reduce a cost associated with providing data to the processor 120 in comparison with conventional sensor implementations that do not communicate data to a processor via a power communication line. For example, communicating data from the sensor module 110 to the processor 120 via the power communication line 130 in place of a separate or dedicated data communication line may, in some embodiments, reduce a cost associated with providing data from the sensor module 110 to the processor 120 by making a dedicated data communication line unnecessary, and/or redundant with the power communication line 130.

Figure 2:
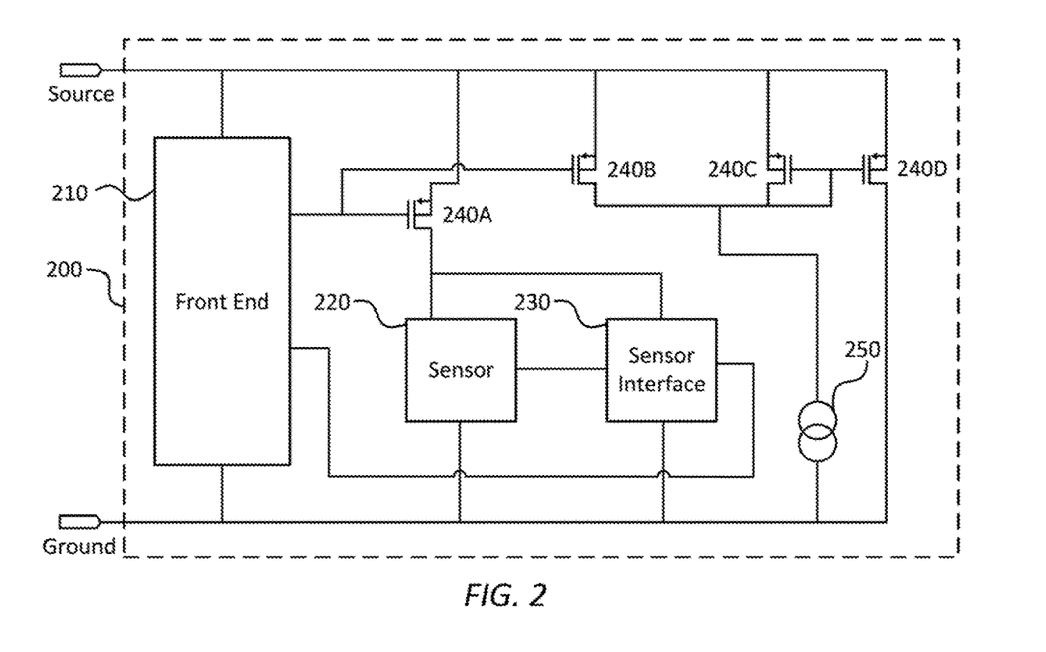
FIG. 2 is a block diagram of a sensor module in accordance with various embodiments.

FIG. 2 is a block diagram of a sensor module 200 in accordance with various embodiments. The sensor module 200 may be implemented, in some embodiments, as a sensor module 110, as discussed above, to capture data and communicate the data to a processor, such as the processor 120. The sensor module 200 may include a front end 210, a sensor 220, a sensor interface 230, a plurality of transistors (e.g., transistors 240A, 240B, 240C, and 240D), and a current source 250. The from end 210 may comprise a plurality of electrical components that may be configured to support operation of the sensor module 200. For example, the front end 210 may comprise one or more voltage regulators, one or more data storage components (e.g., digital logic structures capable of storing data measured by the sensor 220 and/or processed by the sensor interface 230), one or more reference voltage generators, and/or any other electrical components that may support operation of the sensor module 200. The front end 210 may be coupled directly or indirectly to the sensor 220, the sensor interface 230, any of the transistors 240A, 240B, 240C, or 240D, and/or the current source 250. For example, the front end 210 may be coupled to the transistor 240A to control the transistor 240A (e.g., such that the transistor 240A may function in a manner substantially similar to that of a switch) to control a flow of power to the sensor 220 and the sensor interface 230. The front end 210 may also be coupled to the transistor 240B to control the transistor 240B to control a flow of power to the current source 250.

The sensor 220 may be any sensor capable of capturing and outputting an electrical signal based on one or more mechanical or electrical measurements (e.g., related to an area or condition proximate to the sensor 220), a type of which is not limited herein. For example, the sensor 220 may be a digital sensor, an analog sensor, or a combination of both, and may be, for example, a Wheatstone bridge, a pressure sensor, a temperature sensor, a position sensor (e.g., Global Positioning Satellite GPS) or other position determining sensor), an altitude sensor, a moisture sensor, or other like sensor that may capture data related to an area or condition proximate to the sensors. The sensor 220 may be coupled to one or more of the front end 210, the sensor interface 230, and/or other electrical components that support operation of, or interact with, the sensor 220. As such, in some embodiments, the sensor 220 may capture the data and transmit the data to a data storage component (e.g., digital logic structures of the front end 210) to store the data for later transmission, processing, or other forms of use. In other embodiments, the sensor 220 may capture the data and transmit the data to the sensor interface 230. The sensor interface 230 may include one or more electrical components configured to process, manipulate, or otherwise interact with data received from the sensor 220 to form processed data that is based on the data received from the sensor 220. The one or more electrical components of the sensor interface 230 are not limited herein, but may include, for example, any one or more of an analog to digital converter (ADC), a digital to analog converter (DAC), an amplifier, a filter, digital signal processing circuitry, analog signal processing circuitry, or other electrical components that may be suitable for interacting with the data received from the sensor 220. The sensor interface 230 may be coupled to the front end 210 and configured to transmit the processed data to one or more electrical components of the front end 210 (e.g., digital logic structures of the front end 210) for data storage after processing and/or prior to transmission from the sensor module 200 to another electrical component (e.g., a processor).

The front end 210 may be configured to transition the sensor 220 and the sensor interface 230 to a low power mode when the sensor 220 is not capturing data and/or when the sensor interface 230 is not processing data received from the sensor 220 to, for example, configure the sensor module 200 to draw an approximately minimum magnitude of current from the processor. The minimum magnitude of current drawn by the sensor module 200 from the processor may be defined, in some embodiments, as a minimum magnitude of current that may be drawn by the sensor module 200 when the sensor module 200 is powered, but is not capturing and/or processing data (e.g., when only the front end 210 is drawing current from the processor). The front en d 210 may transition the sensor 220 and the sensor interface 230 to the low power mode, in some embodiments, by transmitting a voltage magnitude to the transistor 240A that is insufficient to cause the transistor 240A to permit a flow of power (e.g., a flow of electrons through the, transistor 240A) to the sensor 220 or the sensor interface 230, thereby effectively uncoupling the sensor 220 and sensor interface 230 from the circuit of the sensor module 200. The front end 210 may transition the sensor 220 and the sensor interlace 230 to the low power mode to enable the sensor module 200 to communicate data from the sensor module 200 (e.g., data stored in digital logic structures of the front end 210) to another electrical component (e.g., a processor). Transitioning the sensor 220 and the sensor interface 230 to the low power mode may enable the sensor module 200 to communicate data at a magnitude of power consumption approximately equal to, or less than, a magnitude of power consumed while the sensor 220 is capturing data and/or the sensor interface 230 is processing the data received from the sensor 220.

Once in the lower power mode, the sensor module 200 may communicate data to another electrical component (e.g., such as a processor, as used in the following discussion for the sake of clarity). The sensor module 200 may communicate data (e.g., data captured by the sensor 210 and/or data processed by the sensor module 220), in some embodiments, from a data storage component (e.g., a digital logic structure) that may be located in the front end 210. The data may be communicated by, for example, controlling and/or manipulating a current magnitude drawn by the sensor module 200 from the processor. For example, the processor may monitor a current magnitude drawn by the sensor module 200. Because the sensor module 200 may be configured to draw an approximately constant current magnitude from the processor when the sensor module 200 is not communicating data, if the current magnitude drawn by the sensor module 200 decreases for a predefined period of time, the processor, in some embodiments, may interpret the decrease in current magnitude drawn as an indication that the sensor module 200 is commencing communication of data.

When the processor determines that the sensor module 200 has commenced communicating data, the processor may sample the current magnitude drawn by the sensor module 200 at predefined intervals until the processor determines that the sensor module 200 has stopped communicating data (e.g., based on a stop indication transmitted by the sensor module 200). Each sample of the current magnitude drawn by the sensor module 200 may correspond to a data point of the data being communicated by the sensor module 200. For example, after the processor determines that the sensor module 200 has commenced communicating data, the processor may sample the current magnitude drawn by the sensor module 200 at a first time to receive a first value of the data being communicated by the sensor module 200 and may sample the current magnitude drawn by the sensor module 200 at a second time to receive a second value of the data being communicated by the sensor module 200. As such, the sensor module 200 may be configured to draw the approximately constant current magnitude to represent the first value of the data being communicated by the sensor module 200 and may be configured to draw the approximately minimum current magnitude to represent the second value of the data being communicated by the sensor module 200. Accordingly, in some embodiments, the sensor module 200 may be configured to communicate data at a magnitude of current consumption less than, or equal to, a magnitude of current consumed in acquiring and/or processing the data being communicated. Alternatively, the sensor module 200 may be configured to represent any number of predefined values based on any predefined current magnitude drawn by the sensor module 200 from the processor. For example, the sensor module 200 may be configured to represent binary values, analog values, or any other suitable values based on the current magnitude drawn by the sensor module 200 from the processor. Generally, the sensor module 200 may communicate data to the processor by manipulating a current draw of the sensor module 200 among any number of predefined current magnitudes that are mapped to predefined values known to both the sensor module 200 and the processor, and a number of mappings or predefined values is not limited herein. For example, in some embodiments, the sensor module 200 may communicate the data to the processor by manipulating the current draw of the sensor module 200 between 3 mA and 1 mA.

The sensor module 300 may manipulate the current magnitude drawn from the processor during the low power mode by selectively activating or deactivating the current source 250. While current source 250 is illustrated as a single current source having one value, any number of current sources of predefined magnitudes, as discussed above for the communication of a corresponding number of predefined data values, may be placed in parallel and selectively activated or deactivated to communicate a respective data value from the sensor module 200. The current source 250 may be selectively activated and deactivated, in some embodiments, by coupling or uncoupling the current source 250 from the circuit of the sensor module 250, for example, via a mechanical switch (e.g., a relay) or a solid-state component (e.g., a transistor) functioning as an electrical switch. Alternatively, in some embodiments, the sensor module 200 may include a current consumption configuration component in place of, or in addition to, the current source 250. The current consumption configuration component may be any one or more electrical components (e.g., directly and/or indirectly coupled in series and/or parallel) that may affect the current magnitude drawn by the sensor module 200 from the processor. For example, in, same embodiments, the current consumption configuration component may be one or more resistors or other electrical components that may be selectively activated and deactivated (or switched into, and out of, the circuit of the sensor module 200) to affect the current magnitude drawn by the sensor module 200 from the processor.

The sensor module 200 may be configured to draw the approximately constant current magnitude from the processor based, at least in part, on the current source 250. For example, in some embodiments the current source 250 may be a reference current used to regulate current consumption (e.g., current drawn by the sensor module 200 from the processor) of the sensor module 200. For example, the transistor 240A (which may have a transistor width, in some embodiments, of approximately 100 units) may be controlled by the front end 210, as discussed above, to effectively couple or uncouple the sensor 220 and the sensor interface 230 from the circuit of the sensor module 200 (e.g., to transition the sensor module to, or from, the low power mode). As such, a current flowing through the transistor 240A may be approximately equal to a total current drawn by the sensor 220 and the sensor interface 230. The transistor 240B may, in some embodiments, have a transistor width of approximately 1 unit such that approximately $\frac{1}{100}$ of the current that flows through the transistor 240A will flow through the transistor 240B. As such, the transistor 240B may sense a current magnitude used by the sensor module 200 to capture and/or process data (e.g., by the sensor 220 and/or the sensor interface 230). As such, the combination of the sensor 220, the sensor interface 230, the transistor 240A, and the transistor 240B may consume a magnitude of current approximately equal to 101 times the total current drawn by the sensor 220 and the sensor interface 230.

The transistor 240C may, in some embodiments, have a transistor width of approximately 1 unit and may determine a difference between the current sensed by the transistor 240B and the reference current of current source 250. For example, a current flowing through the transistor 240C may approximately equal a difference between the reference current of current source 250 and the current sensed by the transistor 240B. The transistor 240D may, in some embodiments, have a transistor width of approximately 100 unit and may be configured to multiply the current flowing through the transistor 240C by approximately 100 (e.g., as a result of the ratio of transistor widths of the transistor 240D to the transistor 240C). As such, the combination of the transistor 240C and the transistor 240D may consume a magnitude of current approximately equal to 101 times the reference current of current source 250. Each of the transistors 240A, 240B, 240C, and 240D may, in some embodiments, be p-type metal oxide semiconductor field effect transistors (MOSFETs). Alternatively, in other embodiments, the transistors 240A, 240B, 240C, and 240D may each be constructed according to another suitable methodology or process, and the configuration the circuit of the sensor module 200 may be modified accordingly. Additionally, while each of the transistors 240A, 240B, 240C, and 240D are illustrated as p-type MOSFETs, in some embodiments the transistors 240A, 240B, 240C, and 240D may include transistors constructed according to a plurality of methodologies or processes. Additionally, the widths of the transistors 240A, 240B, 240C, and 240D are expressed in terms of generic units that may vary based on a type of process used to construct the transistors 240A, 240B, 240C, and 240D (e.g., a micrometer process, a nanometer process, etc.).

The configuration of the transistors 240A, 240B, 240C, and 240D and the current source 250 illustrated in FIG. 2 and described above may, in some embodiments, enable a maximum current consumption of the sensor module 200 to be programmed or predetermined according to characteristics of the current source 250. For example, based on the configuration of the transistors 240A, 240B, 240C, and 240D and the current source 250, the current consumption of the sensor module 250 may be determined without respect to the sensor 220 or the sensor interface 230, which may have fluctuating current consumptions over time, load, temperature, etc. As such, a magnitude or the reference current of the current source 250 may be selected to be greater than a maximum total current drawn by the sensor 220 and the sensor interface 230 such that the current consumption of the sensor module 200 when capturing and/or processing data in the active state (e.g., when not in low power mode) is approximately constant based on the current source 250.

While the sensor module 200 illustrates one possible configuration of electrical circuit components suitable for implementing at least some of the disclosed embodiments, other configurations of circuitry that may provide a same or similar functionality are also intended to be included within the scope of the present disclosure. For example, embodiments in which the sensor module 200 maintains an approximately constant current draw from a processor (e.g., which serves as a power source or power supply for the sensor module 200) based on another configuration of electrical circuit components are also intended to be included within the scope of the present disclosure.

Figure 3:
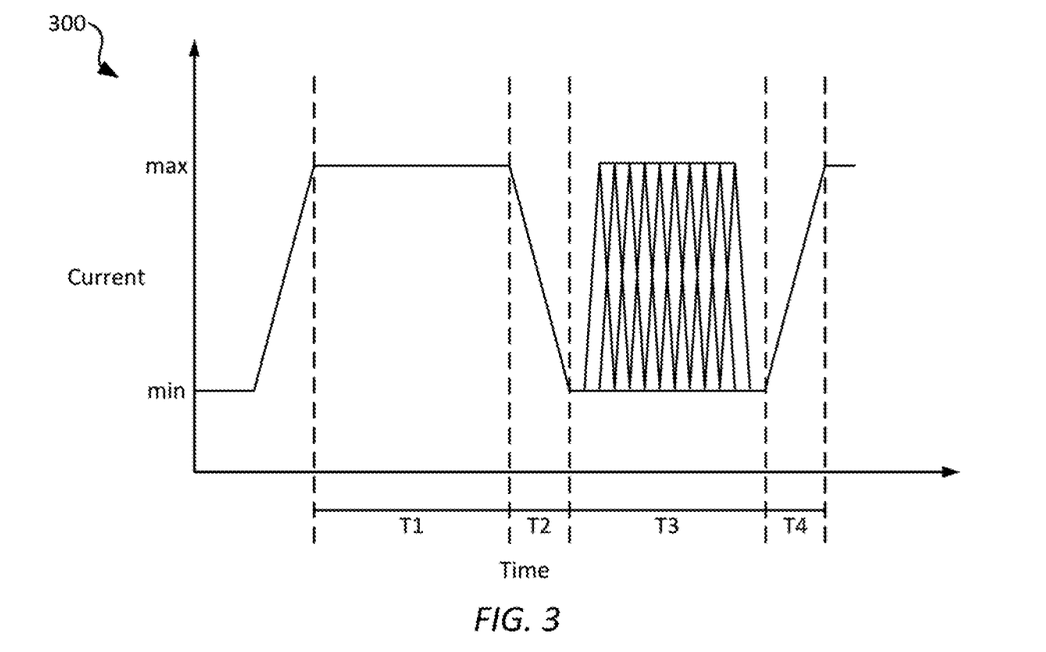
FIG. 3 is a graph of current consumption by a sensor in accordance with various embodiments.

FIG. 3 is a graph 300 of current consumption by a sensor in accordance with various embodiments. For example, in some embodiments the graph 300 may be representative of current consumption (e.g., a current magnitude drawn) by the sensor module 200. A horizontal axis of the graph 300 may be representative of time (e.g., seconds, microseconds, picoseconds, nanoseconds, etc.) and a vertical axis of the graph 300 may be representative of current (e.g., amps, milliamps, microamps, etc.) drawn by the sensor. During the period of time indicated by T1, the sensor may be in an active state (e.g., capturing data and/or processing captured data). When the sensor has finished capturing and/or processing data, in some embodiments, the data may be stored to a data store during the active state. As illustrated by graph 300, the sensor may draw an approximately constant current magnitude from a processor (e.g., the processor 110) during the active state (e.g., a max current). For example, during the active state, the sensor may, in some embodiments, draw approximately 3 mA of current from the processor.

After the sensor captures and/or processes and saves data in the active state, the sensor may be transitioned to a low power state in which one or more components of the sensor are uncoupled from a power supply, as discussed above. For example, one or more components of the sensor may be uncoupled from the power supply such that the sensor may draw approximately a minimum current magnitude from the processor. For example, during the period of time T2, the sensor may be transitioned from the active state to the low power state. In some embodiments, the minimum current magnitude drawn by the sensor from the processor may be approximately 1 mA.

During the time period T3, the sensor may communicate data to the processor via a power supply line coupling the sensor to the processor. For example, the sensor may communicate data by manipulating the current magnitude drawn by the sensor to represent values of the data stored by the sensor, as discussed above. At the beginning of the time period T3, the sensor may draw the minimum current magnitude from the processor for a predefined period of time to indicate to the processor that communication of data from the sensor is commencing. The predefined period of time may be any suitable period of time known to both the sensor and the processor, a duration of which is not limited herein. During the time period T3, the sensor may manipulate the current magnitude drawn by the sensor between the constant current drawn during the active state (e.g., to represent a first value of the stored data such, as a logic-level high value or binary "one") and the minimum current magnitude (e.g., to represent a second value of the stored data such as a logic-level low value or binary "zero"). At the conclusion of the stored data being transmitted or communicated by the sensor to the processor, the processor may draw the minimum current magnitude from the processor for a predefined period of time to indicate to the processor that communication of data from the sensor is concluded. The predefined period of time may be any suitable period of time known to both the sensor and the processor, a duration of which is not limited herein, and may be approximately the same as, or different than, the predefined period of time that indicates communication of data from the sensor is commencing.

During the time period T4, after communicating the data to the processor, the sensor may transition from the low power state to the active state by recoupling the previously uncoupled components to the power supply. Once the sensor is in the active state at the conclusion of the time period T4, the sensor may repeat its process of capturing data, processing and storing the data, and communicating the data. For example, at the conclusion of the time period T4 the sensor may repeat its process as discussed above, beginning with the time period T1, such that the time periods T1, T2, T3, and T4 form a sequential series that is executed by the sensor in a loop.

Figure 4:
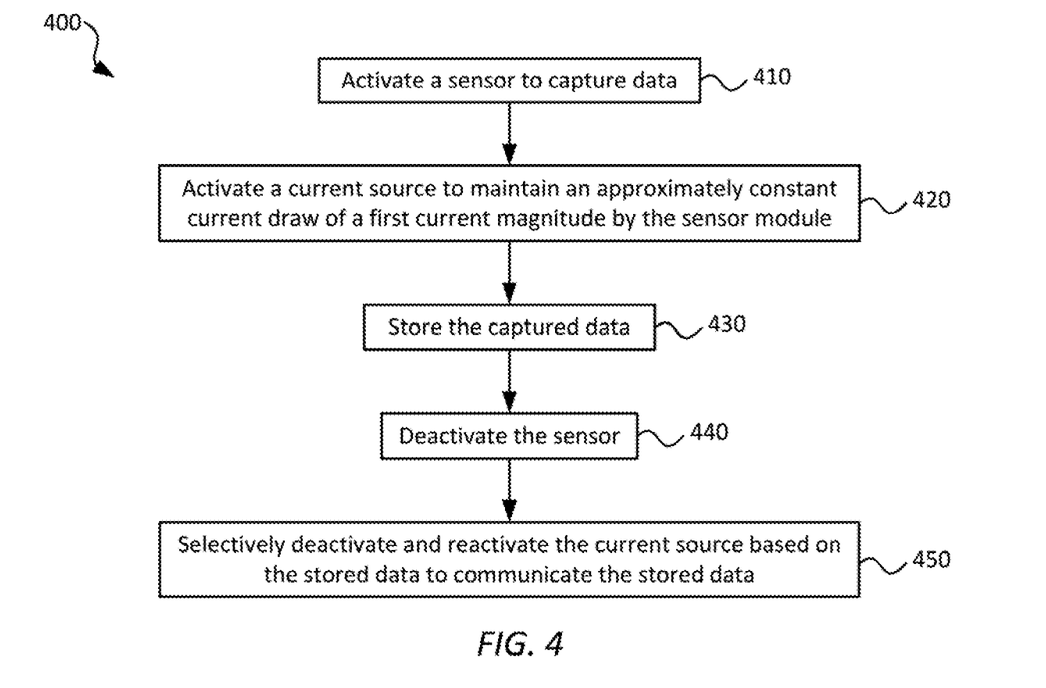
FIG. 4 is a flowchart of a method for capturing data and communicating the data from a sensor module to a processor in accordance with various embodiments.

FIG. 4 is a flowchart of a method 400 for capturing data and communicating the data from a sensor module to a processor in accordance with various embodiments. The method 400 may be performed by a sensor module, such as sensor module 200, that is configured to capture and communicate data. At step 410, the sensor module may activate a sensor of the sensor module to capture the data. For example, the sensor module may activate the sensor by controlling a transistor to cause the transistor to allow a flow of current to the sensor from a processor. Optionally, after capturing the data, the sensor module may process and/or manipulate the data using a sensor interface. At step 420, the sensor module may activate a current source to maintain an approximately constant current draw of a first current magnitude by the sensor module. It should be noted that step 420 may, in some embodiments, be performed prior to, or approximately concurrently with, step 410. The sensor module may draw the approximately constant current draw of the first current magnitude via a first electrical wire that may couple the sensor module to a processor to, at least, provide power to the sensor module from the processor.

At step 430, the sensor module may store the data captured by the sensor and/or processed by the sensor interface. For example, the sensor module may store the data in one or more data stores (e.g., the digital logic structures of the front end 210, discussed above) to enable the sensor module to communicate (e.g., transmit and/or output) the data at a later time and/or when the sensor and/or sensor interface are uncoupled from the processor. At step 440, after the data is captured and stored, the sensor module may deactivate the sensor. The sensor module may deactivate the sensor, in some embodiments, to enter a low power mode, as discussed above. The sensor module may deactivate the sensor, for example, by controlling a transistor to cause the transistor to inhibit a flow of current to the sensor from the processor.

At step 450, the sensor module may selectively deactivate and reactivate the current source based on the data stored at step 430 to communicate the stored data. The sensor module may communicate the stored data to the processor via the first electrical wire such that the first electrical wire may also couple the sensor module to the processor to communicate data from the sensor module to the processor. The sensor module may selectively deactivate and reactivate the current source to represent values of the data stored at step 430, for example, such that a first value of the stored data is represented by the current source being activated and a second value of the stored data is represented by the current source being deactivated. For example, in some embodiments the first value may be a logical "one" and the second value may be a logical "zero." The sensor module may selectively deactivate and reactivate the current source, in some embodiments, by controlling a transistor to inhibit or allow, respectively, a flow of current to or from the current source. In some embodiments, the sensor module may consume approximately 3 mA of current when the current source is activated and may consume approximately 1 mA of current when the current source is deactivated. In some embodiments, after the sensor module may selectively deactivates and reactivates the current source based on the data stored at step 430 to communicate the stored data, the method may further include reactivating the sensor for capturing second data, for example, by returning to step 410 to repeat the method 400.

Numerous other variations and modifications will become apparent to those skilled in the art once the above disclosure is fully appreciated. It is intended that the following claims be interpreted to embrace all such variations, modifications and equivalents. Unless otherwise stated, "approximately" means +/−10 percent of the stated value or of a reference value. In addition, the term "or" should be interpreted in an inclusive sense.

What is claimed is:

1. A device, comprising:
a front end configured to transition a sensor module between a sensor active mode and a sensor inactive mode;
wherein the sensor module includes a sensor;
wherein the front end is configured to adjust currents drawn by the sensor module during the sensor inactive mode;
wherein the currents drawn by the sensor module during the sensor inactive mode correspond to data indicative of at least one reading of the sensor during a preceding sensor active mode.

2. The device of claim 1,
wherein the currents are drawn from a processor coupled to the sensor module.

3. The device of claim 2,
wherein the currents drawn by the sensor module during the sensor active mode have a substantially constant magnitude;
wherein the front end transitions the sensor module between the sensor active mode and the sensor inactive mode by decreasing the currents drawn by the sensor module from the substantially constant magnitude to a minimum magnitude.

4. The device of claim 3,
wherein the front end adjusts the currents drawn by the sensor module during the sensor inactive mode between the substantially constant magnitude and the minimum magnitude.

5. The device of claim 4,
wherein the data indicative of at least one reading of the sensor comprises a digital data set including one or more first binary values and one or more second binary values; and
during the sensor inactive mode,
currents drawn by the sensor module at the substantially constant magnitude represent the one or more first binary values; and
current drawn by the sensor at the minimum magnitude represent the one or more second binary values.

6. The device of claim 4,
wherein the data indicative of at least one reading of the sensor comprise an analog data set;
wherein the currents drawn by the sensor module during the sensor inactive mode are adjusted between the minimum magnitude and the substantially constant magnitude; and
wherein each adjustment of the currents drawn by the sensor module correspond to an analog value.

7. The device of claim 6,
wherein each of the adjustments of the currents drawn by the sensor module are mapped to predefined current magnitude values.

8. The device of claim 1, comprising:
a front end;
a current source;
a first transistor; and
a second transistor;
wherein the front end comprises one or more discrete components configured to activate and deactivate the first transistor;
wherein the first transistor is configured to couple and uncouple the sensor with a processor;
wherein during the sensor active mode, the first transistor is active and the first transistor couples the sensor with the processor;

wherein during the sensor inactive mode, the first transistor is deactivated and the first transistor decouples the sensor from the processor;

wherein front end is configured to activate and deactivate the second transistor;

wherein the second transistor is configured to selectively couple and uncouple the current source with the processor;

wherein when the second transistor is deactivated, the current source is decoupled from the processor;

wherein when the second transistor is activated, the current source is coupled with the processor;

wherein during sensor inactive mode, the second transistor is selectively activated and deactivated; and wherein the data indicative of at least one reading of the sensor is communicated to the processor by the front end selectively activating and deactivating the second transistor.

9. The device of claim 8, wherein the data communicated to the processor is digital data represented by an adjustment of currents drawn by the current source between a minimum magnitude and a substantially constant magnitude;

wherein the minimum magnitude represents a first binary value; and wherein the substantially constant magnitude represents a second binary value.

10. A processor, comprising:

a first connector for coupling a power signal, having a current, to a sensor module;

wherein the sensor module includes a sensor;

wherein the sensor module operates, at any given time, over an operating state comprising one of an active sensor state, a first transition state, and a data transfer state;

wherein the current is drawn by the sensor module during the active sensor state and is a substantially constant current;

wherein the current drawn by the sensor module during the first transition state decreases from the substantially constant current to a minimum current;

wherein the current drawn by the sensor module during the data transfer state varies between the substantially constant current and the minimum current; and wherein the processor is configured to monitor the current drawn by the sensor module and, based on variations in the current arising over a given period of time, determine the operating state of the sensor module.

11. The processor of claim 10, wherein the processor is further configured to interpret, during the data transfer state for the sensor module, the current drawn as corresponding to a data value indicative of a reading of the sensor.

12. The processor of claim 11, wherein the minimum current represent a first analog reading of the sensor;

wherein the substantially constant current represents a second analog reading of the sensor; and wherein the current drawn by the sensor module corresponds to one or more third data values, each of the one or more third data values being incrementally disposed between the minimum current and the substantially constant current and representing one or more third analog readings of the sensor.

13. The processor of claim 10, wherein, during the data transfer state, the substantially constant current is indicative of a first data value and the minimum current is indicative of a second data value; and wherein each of the first data value and the second data value respectively correspond to unique first and second readings of the sensor.

14. The processor of claim 13, wherein the first data value is a logical high digital data value.

15. The processor of claim 13, wherein the current arises over one or more third currents, each of the one or more third currents having a magnitude disposed between the minimum current and the substantially constant current; and wherein each of draw of the one or more third currents by the sensor module correspond to one or more third data values indicative of one or more third readings of the sensor.

16. The processor of claim 10, wherein the operating states for the sensor module further comprise a second transition state arising after the data transfer state; and wherein the processor is further configured to detect the second transition state upon a cessation in variation of the power signal between the substantially constant current and the minimum current over a given period of time.

17. A method of processing data, comprising:

detecting, by a processor, a substantially constant current provided by the processor to a sensor module;

detecting, by the processor, a transition between the substantially constant current and a minimum current provided by the processor to the sensor module; and following detection of the transition,
  interpreting, by the processor, the sensor module as being in a data transfer mode; and
  interpreting transitions between the substantially constant current and the minimum current as data indicative of at least one reading of the sensor module.

18. The method of claim 17, wherein and while the sensor module is interpreted by the processor as being in the data transfer mode, comprising:

interpreting, by the processor, a sampled substantially constant current as being representative of a first data value;

interpreting, by the processor, a sampled minimum current as being representative of a second data value; and wherein the data indicative of at least one reading of the sensor module includes at least one of the first data value and the second data value.

19. The method of claim 18, wherein the first data value corresponds to a digital logic high value.

20. The method of claim 17, wherein the data transfer mode occurs over a predetermined period of time.

* * * * *